July 6, 1943.     H. P. VASSAR     2,323,738
THERMAL DEMAND METER
Filed May 20, 1941     2 Sheets-Sheet 1
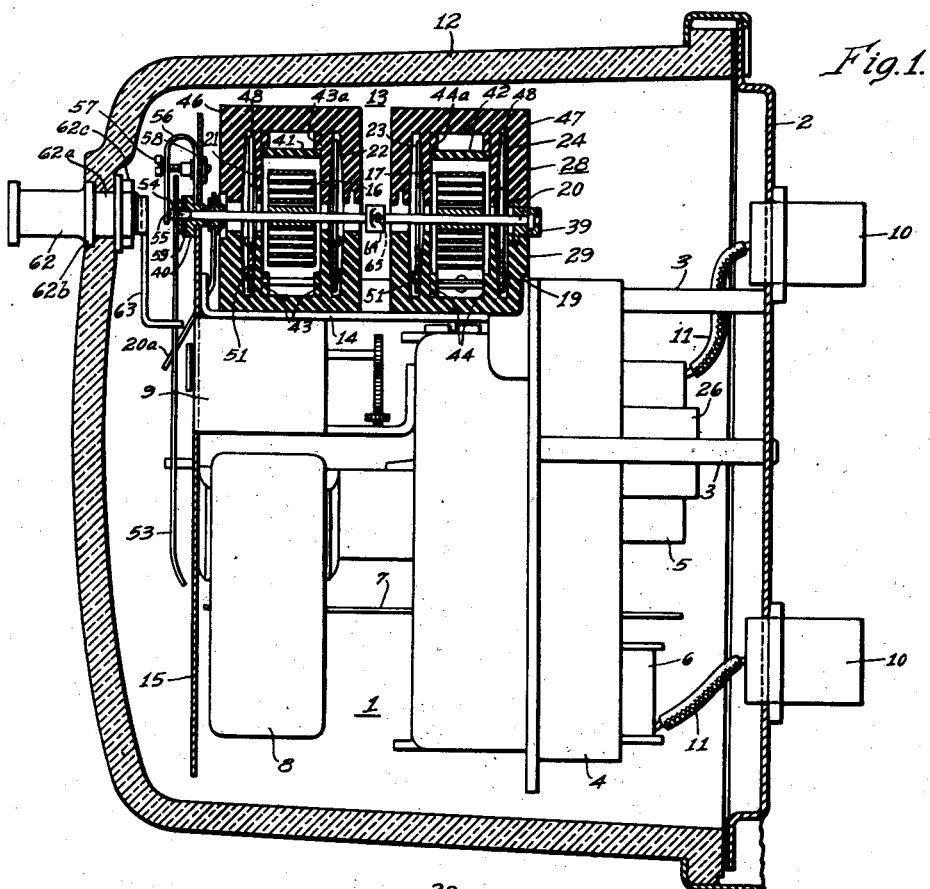
Fig. 1.
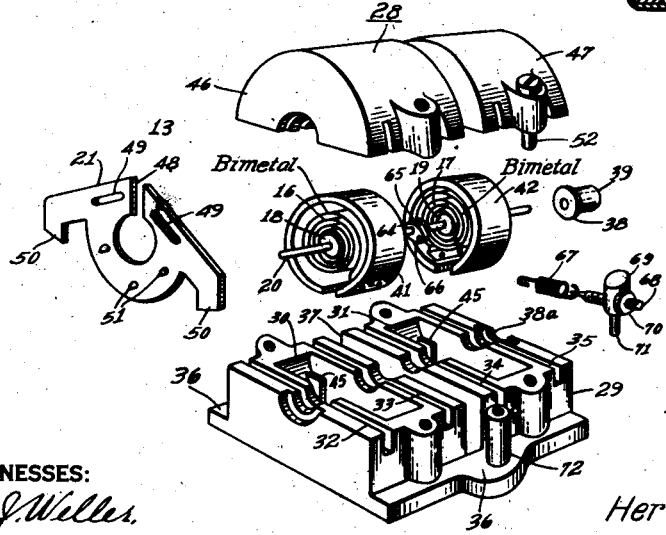
Fig. 3.
WITNESSES:
INVENTOR
Hervey P. Vassar.
BY 
ATTORNEY Patented July 6, 1943

2,323,738

UNITED STATES PATENT OFFICE 2,323,738

THERMAL DEMAND METER

Hervey P. Vassar, Bloomfield, N. J., assignor to Westinghouse Electric & Manufacturing Company, East Pittsburgh, Pa., a corporation of Pennsylvania Application May 20, 1941, Serial No. 394,260

20 Claims. (Cl. 171—34)

This invention relates to measuring instruments, and it has particular relation to measuring instruments for both integrating, and measuring the maximum demand of electrical energy.

Maximum demand devices employed commercially fall into two general classes, block-interval and time-lagged. In the block-interval maximum demand device, the maximum demand pointer moves across its scale at a constant rate when the maximum demand device is subjected to a constant load. However, when a time-lagged maximum demand device is subjected to a constant load, the maximum demand pointer moves across its scale with a speed which diminishes in accordance with the time of deflection. Generally, the rate of diminution of the speed of the pointer in a time-lagged maximum demand device is a logarithmic or exponential function. Examples of the block-interval and time-lagged maximum demand devices are shown respectively in the patents to R. H. Lewis et al., No. 2,047,376, and B. H. Smith, No. 1,417,695, both of which are assigned to the Westinghouse Electric & Manufacturing Company.

The time-lagged maximum demand measuring device closely follows the heating and cooling curves of electrical apparatus. For this and other reasons, such a device is often desirable.

Prior art maximum demand devices of the thermal time-lagged type have required extremely intricate and tedious assembly. Not only does such construction contribute to the initial cost of the device, but it greatly complicates the problems encountered in servicing such devices. Moreover, it has been customary to enclose the thermal maximum demand device in a casing separate from that enclosing an integrating watthour meter. The provision of separate casings for these instrumentalities substantially increases the space requirements thereof and the installation cost.

In accordance with the invention, a thermal maximum demand device is enclosed with a measuring instrument such as an integrating watthour meter in a common casing. Preferably, the maximum demand device is energized in part from the electromagnet of the watthour meter. Since the windings employed for energizing the thermal maximum demand device generally have an appreciable temperature coefficient of resistance, an ambient temperature error is introduced thereby. This error is compensated by forming the heaters of the thermal maximum demand device of a material having a temperature coefficient of resistance larger than that of the windings.

In the prior art, reliance has been placed on heat insulation for preventing undesirable heat transfer between parts of the thermal maximum demand device. By following the teachings of the present invention, such undesired transfer may be minimized by providing relatively good heat conductive paths for conducting heat to the parts to be heated.

The invention further contemplates an improved construction for the thermal maximum demand device. To this end, a housing is provided which includes a base portion and a cover portion. Upon removal of the cover portion, the thermally responsive actuating elements and their associated structure readily may be removed as a unit from the housing. Preferably, the base portion of the housing is formed as a single unit in order to reduce cost and to assure alignment of the various parts of the maximum demand device.

It is, therefore, an object of the invention to provide an improved measuring device including a thermal maximum demand device of improved accuracy.

It is a further object of the invention to provide an improved casing for a thermal maximum demand device.

It is another object of the invention to provide a thermal maximum demand device having readily accessible parts.

It is an additional object of the invention to provide a thermal maximum demand device having improved ambient temperature compensation.

It is still another object of the invention to provide a thermal maximum demand device having improved means for transmitting heat between the heating means and the thermoresponsive elements comprising the device.

Other objects of the invention will be apparent from the following description, read in conjunction with the accompanying drawings, in which:

Figure 1 is a sectional view of a measuring device embodying the invention;

Fig. 3 is an exploded view in perspective of a maximum demand device embodying the invention.

Figure 2:
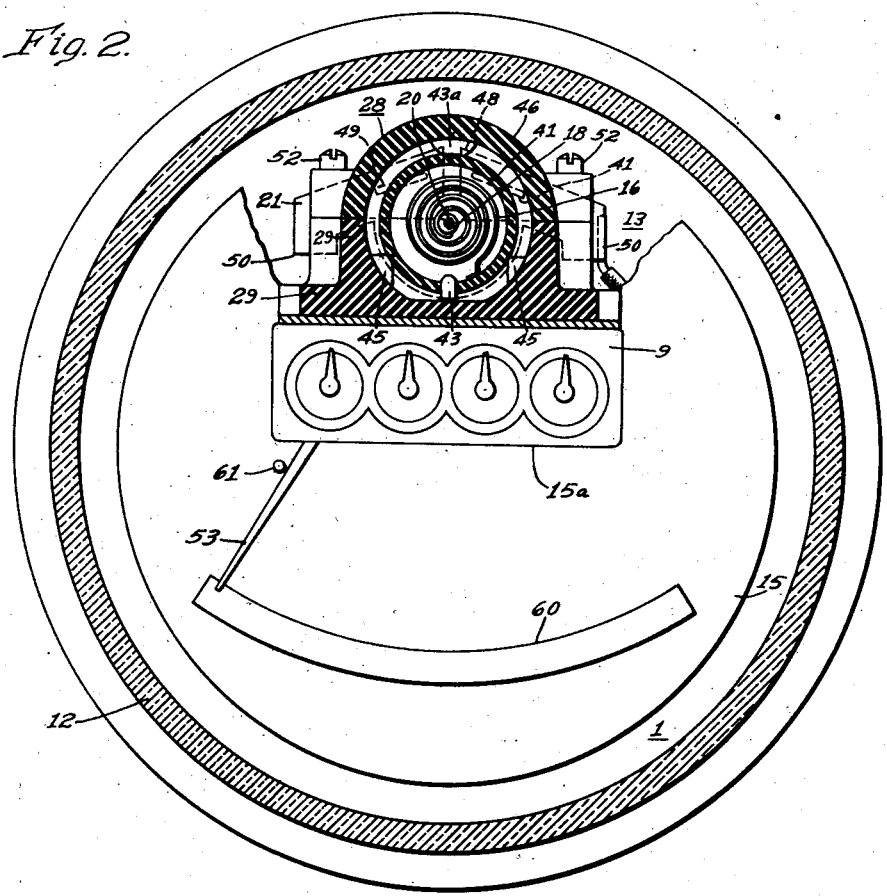
Fig. 2 is a view, in front elevation, with parts broken away of the device illustrated in Fig. 1.

Referring to the drawings, Fig. 1 shows a measuring instrument, such as a watthour meter 1, attached to a base plate 2 by means of suitable pillars 3. The watthour meter may be of generally conventional construction, including an electromagnet 4 having a voltage winding 5 and current windings 6 which cooperate when energized to produce a shifting magnetic field. An electroconductive armature or disk 7 is positioned for rotation in the field produced by the voltage and current windings. Rotation of the armature 7 is retarded by a braking magnet 8. A conventional register 9 may be associated with the armature 7 for integrating the rotation thereof. Preferably, the register is detachably associated with the watthour meter 1, a suitable construction for this purpose being shown in the Miller et al. Patent 1,598,489, which is assigned to the Westinghouse Electric & Manufacturing Company.

The casing for the watthour meter 1 may vary appreciably in construction. In the specific embodiment illustrated in Fig. 1, the casing is designed to provide a detachable watthour meter. For this purpose, the base plate 2 is provided with contact blades 10 which extend through the base plate but are insulated therefrom. These contact blades are connected to the voltage and current windings through suitable conductors 11. The casing also includes a cover 12 which may be of glass. This cover is detachably associated with the base plate 2. It will be understood that the watthour meter 1 is designed to be mounted on a watthour meter socket with the contact blades 10 engaging contact jaws positioned within the socket (not shown). A suitable construction for the casing and the socket of a detachable watthour meter is shown in the Bradshaw et al. Patent 1,969,499, which is assigned to the Westinghouse Electric & Manufacturing Company.

In order to measure the maximum demand of electrical energy supplied through the watthour meter 1, a maximum demand measuring device 13 is associated with the watthour meter 1 within the same cover 12. This device may be mounted on a shelf 14 which is attached to a face plate 15 and to the watthour meter 1. Preferably the face plate 15 is provided with an opening 15a through which the integrating register 9 is exposed and through which the register may be moved readily for attachment, servicing or replacement.

The exact construction of the maximum demand measuring device 13 may vary appreciably but in the specific embodiment illustrated in Figs. 1, 2 and 3, the device includes two bimetallic spiral springs 16 and 17 which have their inner ends attached to hubs 18 and 19. These hubs are fixed to a common shaft 20 which carries a pusher arm 20a for rotation therewith. It will be understood that a bimetallic spring is formed of two dissimilar metals or alloys having different coefficients of thermal expansion. Consequently, when each of the bimetallic springs is heated, its inner end tends to rotate relative to the outer end. The outer ends of the bimetallic springs 16 and 17 are fixed in permanent positions by means which will be described below.

For controlling the temperatures of the bimetallic springs 16 and 17, four heaters 21, 22, 23 and 24 are associated therewith. Each of the bimetallic springs is heated by one pair of heaters, as clearly illustrated in Fig. 1.

The bimetallic springs 16 and 17 are so mounted that when heated they tend to urge the shaft 20 in opposite directions of rotation. Consequently, variations in temperature which affect both springs equally have no appreciable effect on the rotation of the shaft 20 and the pusher arm 20a associated with the shaft. This means that ambient temperature variations have little effect on the accuracy of the maximum demand measuring device.

Rotation of the shaft 20 and of the pusher arm 20a carried thereby is determined by the difference in temperatures of the bimetallic springs 16 and 17. By proper energization of the heaters, the rotation of the shaft and the pusher arm may be made dependent on energy flowing through the watthour meter 1. Connections suitable for this purpose are illustrated in Fig. 4.

Figure 4:
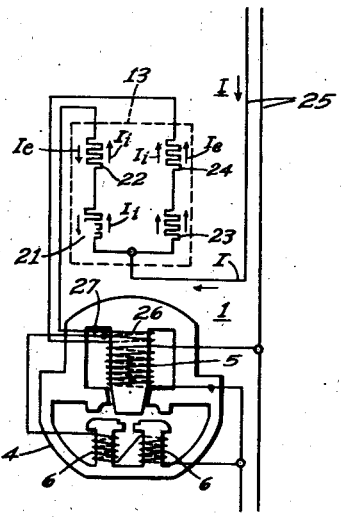
Fig. 4 is a schematic view showing circuit connections for the device illustrated in Figs. 1 and 2.

Referring to Fig. 4, the voltage winding 5 and current winding 6 of the watthour meter 1 are shown associated with a circuit 25 for the purpose of measuring energy flowing therethrough. The heaters 21, 22, 23 and 24 are connected in a series circuit for energization by a current $I_e$ which varies in accordance with the voltage of the circuit 25. Although the heaters could be connected to the circuit directly or through a separate transformer, an appreciable saving in space and cost may be effected by energizing the heater from the voltage winding 5 of the watthour meter 1. For this purpose, the voltage pole of the watthour meter 1 is provided with an auxiliary secondary winding 26. This auxiliary winding 26 constitutes the secondary winding of a transformer in which the voltage winding 5 of the watthour meter is the primary winding. Consequently, the output of the secondary winding 26 may be represented by the current $I_e$ which varies in accordance with the voltage of the circuit 25.

Each of the heaters 21, 22, 23 and 24 also is heated by a current $I_1$ which varies in accordance with the current $I$ of the circuit 25. This current may be obtained by connecting one terminal of the current winding 6 to a centrally disposed tap 27 on the secondary winding 26. By inspection of Fig. 4, it will be noted that the heaters 21 and 22 and the heaters 23 and 24 form two arms of a parallel circuit which is connected in series with the current winding 6 of the watthour meter for energization by the current $I$ flowing in the circuit 25. Consequently, the current $I_1$ in each heater is equal to one-half of the current $I$ flowing in the circuit 25.

Instantaneous directions of the flow for the currents $I_e$ and $I_1$ are indicated by arrows in Fig. 4. It will be observed that the directions of flow are such that the currents $I_e$ and $I_1$ add vectorially in the heaters 23 and 24 and subtract vectorially in the heaters 21 and 22. Consequently, when current flows in the circuit 25, a larger resultant current flows in the heaters 23 and 24 than in the heaters 21 and 22. With a circuit as illustrated in Fig. 4, the rotation of the shaft 20 and the pusher arm 20a of the maximum demand measuring device 13 is dependent upon energy flowing in the circuit 25, as well understood in the art. Other connections are shown in the aforesaid patent to B. H. Smith.

The operating parts of the maximum demand measuring device 13 are enclosed in a suitable housing 28 which includes a base portion 29. This base portion is provided with two chambers 30 and 31 for receiving respectively the bimetallic springs 16 and 17. In addition, the base portion 29 includes four slots 32, 33, 34 and 35 for receiving respectively, the heaters 21, 22, 23 and 24. Although separate housings may be employed for each of the bimetallic springs, preferably the base portion is a unitary structure wherein the chambers 30 and 31 are connected by webs 36 of restricted cross section. The restriction of the cross section is for the purpose of restricting the transmission of heat between two chambers. As a further guard against the transmission of heat between the chambers, the chambers are separated by a substantial air space 37. Moreover, it will be noted that the webs 36 are positioned as much below the bimetallic springs 16 and 17 as is practical. Such a positioning of the webs increases the length of the path offered to heat flowing between the two chambers and consequently serves further to reduce the heat transmission therebetween.

The base portion 29 also has a slot 38a for receiving the ring flange 38 of a bearing 39. This bearing is for the purpose of receiving one end of the shaft 20. The remaining end of the shaft 20 is positioned in a bearing 40 carried by the face plate 15.

In order to position accurately the outer ends of the bimetallic springs 16 and 17, these ends are attached, respectively, to split rings 41 and 42. These split rings may be of heat conductive material such as metal or of insulating material, such as a phenol condensation product, depending upon the particular characteristic desired. In the specific embodiment illustrated in Figs. 1, 2 and 3, it may be assumed that the split rings 41 and 42 are of an insulating material, such as a phenol formaldehyde condensation product. The attachment of the ends to the split rings may be in any suitable manner as by rivets.

To assist in positioning the split rings, the base portion 29 is provided with one or more ribs for each of the split rings. For example, ribs 43 are provided for the split ring 41, and ribs 44 are provided for the split ring 42. When each spring and its associated split ring are inserted in a chamber, the ribs 43 and 44 are received between the ends of the split ring to position the ring within the chamber. Since the ring is somewhat resilient, the ends thereof may be spaced apart normally by a distance slightly less than the corresponding dimension of the ribs. This serves to eliminate play between the ribs and ring. By inspection of Fig. 1, it will be noted that the split rings 41 and 42 serve to space the bimetallic springs 16 and 17 slightly from the walls of the chambers provided in the housing 29.

Preferably an air space is left between the outer surface of each split ring and the surface of the associated chamber in order to provide increased heat insulation for the enclosed bimetallic spring. To this end, four abutments 45 may be positioned symmetrically in the base portion for each chamber to contact the associated split ring and space it from the curved wall of the chamber.

Each of the chambers is provided with a cap 46 and 47 for completing the enclosure of each bimetallic spring. Although these caps may be associated in a unitary structure similar to the base portion 29, preferably they are completely separated in order to increase the heat insulation between the chambers. The caps 46 and 47 are provided with chambers and slots for receiving the bimetallic springs, split rings, bearing and heaters which are similar to the chambers and slots in the base portion 29. It will be noted that each of the caps includes ribs 43a and 44a which engage the outer surface of the associated split rings to complete the positioning of the rings in their respective chambers. Because of this construction, an air space is left substantially around each split ring.

The housing 28 may be constructed of various materials. Preferably the material selected is a heat and electrical insulating material, such as a phenol formaldehyde condensation product. Because of the accessible construction of the base portion 29 and the caps 46 and 47, these parts may be formed readily by a molding or casting operation. To facilitate such molding or casting, the various chambers and slots may taper slightly, as illustrated in Fig. 1.

With the disposition of the parts as illustrated in Figs. 1 and 3, heat from the various heaters is applied uniformly to all convolutions of the spiral bimetallic springs. Each of the heaters may be formed substantially as illustrated in Fig. 3. It will be noted that each heater is substantially of U-shape, having a channel 48 communicating with a centrally disposed opening therein. Because of the aligned channel in the four heaters, the shaft 20 may be moved readily therethrough when the bimetallic spring and shaft assembly is to be inserted or removed without disturbing the connections for the heaters. If desired, slits 49 may be formed in the heaters for the purpose of increasing the resistance thereof. Moreover, each of the heaters is provided with projections 50 which project from opposite sides of the housing 28 for the purpose of receiving the electrical connections, which connections are illustrated, for example, in Fig. 4.

Although the housing 28 is of a heat insulating material, it is a better conductor of heat than is air. In order to provide the best heat transmission from each heater to the associated bimetallic spring, each of the heaters preferably is urged into intimate contact with that wall of its slot which is nearest to the associated bimetallic spring. For this purpose, each of the heaters may be provided with protuberances 51 for urging the heater against the desired surface. Conveniently, the protuberances 51 may be formed by deforming portions of the heaters. With such a construction, heat developed by each heater flows directly through the thin partition between the heater and its associated bimetallic spring and then across a small air space to the bimetallic spring.

Furthermore, it will be noted that the provision of the protuberances 51 provides an air space between each heater and the outer wall of the associated base portion and cap. This air space contributes further to the insulation of the chamber for each bimetallic spring. Since an additional air space is provided external to the exterior surface of each split ring 41 or 42, it is evident that each bimetallic spring together with its heaters are surrounded substantially by an insulating air space.

The caps 46 and 47 may be secured to the base portion 29 by suitable bolts 52 which, if desired, also may be employed for securing the base portion to the shelf 14.

From the foregoing discussion, it is believed that the assembly of the maximum demand measuring device 13 is apparent. The base portion 29 is first positioned on the shelf 14. The heaters 21, 22, 23 and 24 then are dropped into their respective slots and are connected appropriately in accordance with the circuit illustrated in Fig. 4, or any other suitable circuit. The bimetallic springs 16 and 17, together with the shaft 20, the pusher arm 20a, and the rings 41 and 42 next are dropped through the channels 48 into the base portion 29 and the shaft 20 is inserted in the bearing 40. Sufficient play is available for the shaft 20 to permit this insertion in the bearing 40. Before the shaft 20 is dropped to its final position, the bearing 39 may be slipped over the remaining end of the shaft for reception in the slot 37. With the parts so positioned, the caps 46 and 47 may be applied to the base portion 29 and attached in final position by means of the bolts 52. If for any reason, the maximum demand measuring device requires servicing or replacement, the caps 46 and 47 may be readily removed and the bimetallic springs 16 and 17, together with the shaft 20, may be removed as a unit without further disturbing the device.

The rotation of the shaft 20 may be shown in any desired manner. For example, a maximum demand pointer 53 may be mounted for rotation over the face plate 15. In the specific embodiment illustrated in Fig. 1, the pointer 53 is fixed to a stub shaft 54 which has one end partly inserted in the bearing 40. The stub shaft 54 also carries a ring flange 55 which is fixed to the stub shaft. This ring flange is urged toward the bearing 40 by means of a spring 56 which may be adjusted to exert any desired pressure by means of a screw 57. This screw 57 engages a threaded member 58 carried by the face plate 15. If desired, a friction pad, such as a felt pad 59, may be inserted between the ring flange 55 and the bearing 40, in order to assist in holding the pointer 53 in any position to which it is actuated.

A scale 60 (see Fig. 2) may be printed on the face plate 15 for cooperation with the maximum demand pointer 53. In addition, a zero stop 61 may be provided on the face plate 15 for stopping the pointer 53 in its zero or initial position. By inspection of Fig. 1, it will be noted that the pusher arm 20a projects through a slot in the face plate 15 for engagement with the maximum demand pointer 53. Consequently, the maximum demand pointer takes a position which corresponds to the maximum rotation of the shaft 20 and the pusher arm 20a during any desired period. At the end of this period, the maximum demand pointer 53 may be reset by means of a resetting knob 62 which has a shaft 62a projecting through the cover 12. The shaft carries a spring arm 63 on its interior end. A suitable flange 62b and nut 62c on the shaft prevent axial movement thereof. Rotation of the knob 62 by a meter reader carries the spring arm 63 into engagement with the maximum demand pointer for returning the pointer into engagement with the zero stop 61. At this point, the spring arm 63 slips over the maximum demand pointer to leave the maximum demand pointer free for further actuation by the pusher arm 20a. In accordance with the customary practice, the knob 62 may be provided with a seal (not shown) to prevent unauthorized operation thereof.

It will be noted that the register 9 is readily detached through the face plate 15. Although the maximum demand pointer 53 may overlie the register, the pointer may be readily displaced to one side in order to permit detachment or insertion of the register 9.

In operation, the voltage winding 5 and the current winding 6 emit heat. By mounting the maximum demand device 13 asymmetrically relative to these windings, it is possible to vary the characteristics thereof. For example, the bimetallic spring 17 is heated in accordance with the vector sum of the currents $I_e$ and $I_i$. When heated this spring tends to urge the shaft 20 in a counterclockwise direction, as viewed in Fig. 2. The bimetallic spring 16 is heated in accordance with the vector difference between the same currents and, when heated, tends to urge the shaft 20 in a clockwise direction, as viewed in Fig. 2. Although the chambers containing the bimetallic springs are well insulated from each other, some heat is transmitted therebetween and the amount of heat transmitted therebetween varies in accordance with the temperature difference between the two chambers. This temperature difference, in turn, is dependent upon the current flowing in the associated circuit. The heat transmission between the chambers may be taken into account when calibrating the maximum demand device. However, if the bimetallic spring 17 is mounted in the path of heat generated by the windings 5 and 6, the heat from these windings tends to compensate for the heat transmitted between the two chambers thereby contributing to a more uniform scale.

As previously pointed out, the fact that the bimetallic springs act in opposition to each other tends to make these springs self-compensating for ambient temperature values. However, ambient temperature affects other parts of the measuring device to introduce possible sources of error. For example, the windings 5 and 26 may vary appreciably in resistance in response to variations in ambient temperatures. Such variations would introduce an error in the maximum demand measuring device readings. The variation in resistance of the windings 5 and 26 may be compensated by proper selection of the materials employed for the heaters 21, 22, 23 and 24.

In the prior art, it has been customary to make heaters for thermal demand units of a material having a low temperature coefficient of resistance, such a Manganin. This was for the purpose of avoiding errors introduced by variations in the resistance of the heaters as the result of temperature changes.

In order to compensate for variations in resistance of the windings 5 and 26, the heaters 21, 22, 23 and 24 may be formed of a material having a high positive temperature coefficient of resistance. The coefficient of the material employed for the heaters is appreciably higher than that of the material (usually cooper) employed for the windings 5 and 26. As illustrative of a suitable material, soft iron may be employed for the heaters. Under the influence of ambient temperature changes, the resistance of the windings 5 and 26 may change but the resistance of the heaters 21, 22, 23 and 24 changes by an amount sufficiently great to compensate for the variations in the windings 5 and 26.

In order to permit the adoption of standard printed scales, adjusting means may be provided for the maximum demand measuring device. Such adjusting means may take the form of a lever 64 which is attached to the shaft 20 by means of a set screw 65. The lever 64 is provided with a hole 66 for the reception of one end of a coil spring 67. The remaining end of the spring 67 is attached to a screw 68 which extends through an opening provided in a post 69. The screw 68 may be moved relative to the post 69 by rotation of a thumb nut 70. Attachment of the post 69 to the maximum demand measuring device may be effected in any suitable manner as by a pin 71 which extends through a pillar 72 formed on the base portion 29.

To adjust the maximum demand measuring device, the set screw 65 is loosened to permit the lever 64 to rotate relative to the shaft 20. With the parts in this condition, the maximum demand pointer and the pusher arm 20a are moved to their zero positions whereupon the set screw 65 is actuated into firm engagement with the shaft 20. As a result of this step, the lever aligns itself with the coil spring 67 when the maximum demand pusher arm 20a is in its zero position. Consequently, any adjustment of the spring 67 has no effect upon the zero setting of the maximum demand device.

A known constant load is then applied to the circuit associated with the maximum demand measuring device. If the pointer 53 and the pusher arm 20a fail to take a position corresponding to this known load, the thumb nut 70 is manipulated to vary the tension in the spring 67 until a correct reading is obtained. This completes the adjustment for the device. The adjustment is described more fully in the aforesaid Smith patent.

Since the invention is susceptible to numerous modifications, the invention is to be restricted only by the appended claims.

Certain subject matter herein disclosed is disclosed and claimed in the copending B. H. Smith application, Serial No. 393,343, filed May 14, 1941, and assigned to the same assignee.

I claim as my invention:

1. In a measuring device, a pair of thermoresponsive units, means differentially responsive to the outputs of said thermoresponsive units, means for heating each of said thermoresponsive units in accordance with functions of a quantity to be measured, an insulating housing providing a substantially separate enclosed space for each of said thermoresponsive units and its associated heating means, and means for spacing said thermoresponsive units and said heating means from said housing to provide a separate air space within said housing substantially surrounding each of said thermoresponsive units and its associated heating means.

2. In a measuring device, a pair of thermoresponsive units, means differentially responsive to the outputs of said thermoresponsive units, means for heating each of said thermoresponsive units in accordance with functions of a quantity to be measured, an insulating housing providing a substantially separate enclosed space for each of said thermoresponsive units and its associated heating means, means for spacing said thermoresponsive units and said heating means from said housing to provide a separate air space within said housing substantially surrounding each of said thermoresponsive units and its associated heating means, and electrical insulating means extending between each of said thermoresponsive units and its associated heating means for providing a relatively good heat conductive path therebetween.

3. In a measuring device, thermoresponsive means, means for heating said thermoresponsive means, and housing means of insulating material having separate chambers for said thermoresponsive means and said heating means, said heating means including a sheet of electrical heater material having one face adjacent said thermoresponsive means and having integral spacing means extending from a second face thereof for spacing said heating means from said housing means.

4. In a measuring device, thermoresponsive means including a shaft, a plurality of electrical heaters for said thermoresponsive means, each of said heaters substantially surrounding said shaft but having a channel permitting insertion and withdrawal of said shaft therethrough, and means mounting said heaters with their channels in alignment whereby said shaft may be withdrawn or inserted readily relative to all of said heaters.

5. In a measuring device, thermoresponsive means including a shaft, a plurality of electrical heaters for said thermoresponsive means, each of said heaters substantially surrounding said shaft but having a channel permitting insertion and withdrawal of said shaft therethrough, and a housing including means mounting said heaters with their channels in alignment whereby said shaft may be withdrawn or inserted readily relative to all of said heaters, said housing comprising a plurality of sections separable in a direction substantially transverse to said shaft for providing access to said thermoresponsive means.

6. In a measuring device, thermoresponsive means including a shaft positioned for rotation in accordance with variation in temperature of said thermoresponsive means, electrical heating means for said thermoresponsive means, and housing means for said thermoresponsive means and said electrical heating means, said housing means including a unitary section of electrical insulating material having separate chambers for said thermoresponsive means and for said heating means, said insulating material having a thermal conductivity higher than that of air, and said section having an inlet to the chamber for said thermoresponsive means positioned to permit mounting and removal of said thermoresponsive means relative to said section in a direction transverse to the axis of said shaft.

7. In a measuring device, a plurality of thermoresponsive means, means differentially responsive to said thermoresponsive means, housing means including a unitary section having separate chambers for respectively receiving said thermoresponsive means, and heating means for at least one of said thermoresponsive means, the portion of said section between said chambers having a substantially reduced cross-section positioned substantially below a major portion of said thermoresponsive means when said thermoresponsive means are disposed generally at the same horizontal level.

8. In an electrical energy measuring device, a plurality of thermoresponsive means, means including a shaft differentially responsive to said thermoresponsive means, a plurality of electrical heaters effective when energized for heating said thermoresponsive means, each of said heaters being formed substantially of sheet electrical resistance material, and housing means for said thermoresponsive means, said shaft and said electrical heaters, said housing means including a unitary section of insulating material having spaced chambers for receiving said thermoresponsive means, and having spaced slots for receiving said heaters.

9. In an electrical energy measuring device, a plurality of thermoresponsive means, means including a shaft differentially responsive to said thermoresponsive means, a plurality of electrical heaters effective when energized for heating said thermoresponsive means, each of said heaters being formed substantially of sheet electrical resistance material, and housing means for said thermoresponsive means, said shaft and said electrical heaters, said housing means including a unitary section of insulating material having spaced chambers for partially enclosing said thermoresponsive means, and having spaced slots for partially receiving said heaters, and a separate cap of insulating material cooperating with said section for completing the enclosure of each of said thermoresponsive means, said caps having chamber and slot recesses for receiving said thermoresponsive means and the associated heaters.

10. In a measuring device, thermoresponsive means for measuring a variable quantity, said thermoresponsive means having a pair of relatively movable portions, a housing for said thermoresponsive means, and readily detachable means for accurately positioning one of said portions relative to said housing, said readily detachable means including cooperating interfitting male and female parts on said thermoresponsive means and said housing, said female part being proportioned to receive slidably and snugly said male part for accurately positioning one of said portions in a predetermined assembled position relative to said housing, said male and female parts being separable by relative movement of said thermoresponsive means and said housing only in a predetermined direction from their normal assembled positions.

11. In a measuring device, thermoresponsive means including a bimetallic element, a housing for said bimetallic element, a ring member attached to said element, and cooperating means on said ring member and said housing responsive to placement of said ring member in said housing for detachably positioning said ring member relative to said housing.

12. In a measuring device, thermoresponsive means including a spiral bimetallic element, a housing for said bimetallic element, a ring member surrounding said bimetallic element and attached thereto, and cooperating male and female parts carried by said ring member and said housing for detachably positioning said ring member relative to said housing.

13. In a measuring device, thermoresponsive means including a bimetallic spring, a split ring member surrounding said bimetallic spring and attached to an end of said bimetallic spring, a housing having a chamber for receiving said ring member and bimetallic spring, said housing having a projection disposed for reception between the ends of said split ring member for positioning said ring member and bimetallic spring relative to said housing, and means for suspending said split ring in said chamber with a substantial part of the external surface of said ring spaced from the housing.

14. In a measuring device, thermoresponsive means, electrical heating means for heating said thermoresponsive means in accordance with a variable quantity, and a copper-containing electrical circuit for energizing said heating means, said electrical heating means having a temperature coefficient of resistance greater than the corresponding coefficient of copper for compensating for variations in heating of said thermoresponsive means resulting from variations in temperature of said electrical circuit.

15. In a measuring device, a plurality of thermoresponsive means, means differentially responsive to said thermoresponsive means, electrical heating means for each of said thermoresponsive means, means including an impedance for energizing said electrical heating means, said heating means having a higher temperature coefficient of resistance than the corresponding coefficient of said impedance for compensating for variations in resistance with respect to temperature of said energizing means.

16. In a measuring device, a watthour meter having a voltage winding, a thermal maximum demand unit having electrical heating means, and means for energizing said heating means in part from said voltage winding, said heating means having a temperature coefficient of resistance which is substantially larger than the corresponding temperature coefficient of said voltage winding for compensating for variations in resistance with respect to temperature of said voltage winding.

17. In a measuring device, an actuating assembly including a shaft, and a plurality of thermoresponsive, spiral, bimetal elements having inner ends attached to said shaft; an enclosure formed of electrical insulating material for said actuating assembly, said enclosure comprising a unitary base section having a plurality of chambers for reception of said bimetal elements, a plurality of electroresponsive heater members carried by said base and designed to surround substantially said shaft, said heater members having aligned channels permitting insertion and removal of said actuating assembly as a unit relative to said base section, and cover means cooperating with said base section substantially to enclose said actuating assembly; and interfitting, detachable male and female parts associated with said bimetal elements and said enclosure, said interfitting parts being effective in response to placement of said actuating assembly in said enclosure for retaining the free ends of said bimetal elements in predetermined positions relative to said enclosure.

18. In a thermal device for measuring a variable electrical quantity, a housing comprising a base portion and a cover portion, said housing having a plurality of chambers which are exposed when said base and cover portions are separated, thermoresponsive means positioned in certain of said chambers, electrical heating means positioned in certain of said chambers, and means for detachably positioning said thermoresponsive means in a predetermined position in said housing for the reception of heat from said electrical heating means, said positioning means comprising interfitting portions on said housing and said thermoresponsive means having configurations permitting withdrawal of said thermoresponsive means from said housing in a predetermined direction when said cover and base portions are separated.

19. In a thermal device for measuring a variable electrical quantity; an actuating assembly comprising a shaft, a pair of thermoresponsive means for actuating said shaft, and means connecting said thermoresponsive means to said shaft at axially spaced positions; a housing for said actuating assembly comprising a base section and a cover section separable in a direction substantially transverse to said shaft, means associated with said housing for mounting said shaft for rotation therein intermediate said sections, said housing having chambers for receiving said thermoresponsive means configured to permit withdrawal of said actuating assembly as a unit in a direction substantially transverse to said shaft when said sections are separated, and electrical heating means in said housing for heating at least one of said thermoresponsive means, said electrical heating means substantially surrounding said shaft and having a channel through which said shaft moves during said withdrawal.

20. In a thermal device for measuring a variable electrical quantity; an actuating assembly comprising a shaft, a pair of thermoresponsive means for actuating said shaft, and means connecting said thermoresponsive means to said shaft at axially spaced positions; a housing for said actuating assembly comprising a base section and a cover section separable in a direction substantially transverse to said shaft, means associated with said housing for mounting said shaft for rotation therein intermediate said sections, said housing having chambers for receiving said thermoresponsive means configured to permit withdrawal of said actuating assembly as a unit in a direction substantially transverse to said shaft when said sections are separated, and means positioning at least a portion of one of said thermoresponsive means relative to said housing, said positioning means comprising interfitting, detachable male and female parts associated with said thermoresponsive means and said housing, said interfitting means being effective in response to placement of said actuating assembly in said housing for positioning the associated thermoresponsive means relative to said housing.

HERVEY P. VASSAR.